United States Patent [19]

Gresko

[11] 4,314,762
[45] Feb. 9, 1982

[54] FOCUSED, SINGLE STRAND, OPTICAL FIBER ROTATIONAL ALIGNMENT IMAGE-SENSING AND COMPARING SYSTEM

[75] Inventor: Laurence S. Gresko, Long Beach, Calif.

[73] Assignee: The United States of America as represented by the Secretary of the Air Force, Washington, D.C.

[21] Appl. No.: 154,718

[22] Filed: May 30, 1980

[51] Int. Cl.³ .............................................. G01B 11/26
[52] U.S. Cl. ..................................... 356/150; 350/15; 350/96.10
[58] Field of Search .................... 350/96.15, 96.31; 356/150, 399, 400, 375, 376

[56] References Cited

U.S. PATENT DOCUMENTS

| 3,207,904 | 9/1965 | Heinz ................................... 356/150 |
| 3,669,549 | 6/1972 | Besson et al. ........................ 356/150 |
| 3,801,181 | 4/1974 | Kitano et al. ..................... 350/96.31 |
| 3,990,796 | 11/1976 | Foltz ..................................... 356/150 |

OTHER PUBLICATIONS

Uchida et al. "Optical Characteristics of a Light-Focusing Fiber Guide and Its Applications," IEEE Journal of Quantum Electronics, vol. QE-6, No. 10, (Oct. 1970, pp. 606–612).

Primary Examiner—R. A. Rosenberger
Attorney, Agent, or Firm—Donald J. Singer; Jacob N. Erlich

[57] ABSTRACT

This system permits the detection of rotational misalignment (i.e., twist) of two initially aligned, but separated, members. The two aligned members are linked by a single strand of focused optical fiber which, in combination with other co-acting components of the system, allows the user to detect rotational mis-alignment (i.e., twist) of the members, based upon the phenomenon that a single strand of focused optical fiber is functionally capable of conveying a formed, completed, and real image from one end of the fiber to the other end. Accordingly, one end of the fiber is attached to one member where an image is formed, and that formed image is transmitted to the other end which is attached to the other member where the transmitted image is sensed and compared to what the image should be if the members are still rotationally aligned. If the image that is received at the other end is positionally different (i.e., twisted), then the members are rotationally mis-aligned.

4 Claims, 3 Drawing Figures

FOCUSED, SINGLE STRAND, OPTICAL FIBER ROTATIONAL ALIGNMENT IMAGE-SENSING AND COMPARING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the optical sensing art and, more specifically to an optical rotational alignment image-sensing and comparing system in which a single strand of optical fiber (i.e., not a "bundle" or other plurality of optical fibers) is a principal component.

It is fair and accurate to say that prior position sensor systems of the optical type which are used to sense the rotation (i.e., mis-alignment or "twist") of a component around, and transverse to, the optical axis of the sensor system, are complicated in structure, are bulky, are costly, are time-consuming to align, require re-alignment after each use, and because of the human factor involved in initial (and, each subsequent necessary) alignment, may not be reliable.

There is, therefore, a continuing need for an optical position sensor system in which the above-mentioned disadvantages are eliminated or, at least, minimized.

This invention fulfills this continuing need; and, thereby, it constitutes a significant advance in the state-of-the-art.

SUMMARY OF THE INVENTION

The principal object of this invention is to provide a focused, single strand, optical fiber rotational alignment image sensing and comparing system which can be set up and used, quickly and easily, to determine if a first member and a second member are rotationally (or rotatably) aligned, i.e., not "twisted" in positional relationship to each other.

Another object of this invention is to provide an optical alignment sensing and comparing system which is simple in structure, is low in cost, and is re-usable without having to be re-aligned after each use.

Still another object of this invention is to permit, optically, the sensing and comparing of the alignment of the two members which are continuously being "tested" or aligned, irrespective of whether the members are in geometrically linear (or co-axial) alignment, e.g., even if the two members are in non-linear, spaced-apart relationship.

These objects of this invention, as well as other related objects of this invention (e.g., "fail-safe" reliability, and compactness) will become readily apparent after a consideration of my invention, together with reference to the Figures of the drawings.

DESCRIPTION OF PRIOR ART OPTICAL FIBERS

Figure 1:
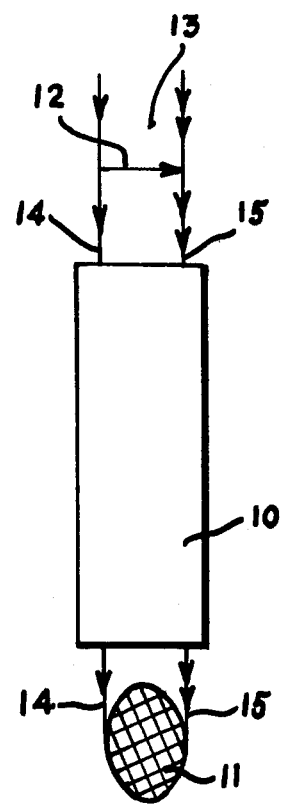
FIG. 1 is a pictorial and schematic depiction, in simplified form, of a representative early prior art single strand of optical fiber (hereinafter referred to as a "conventional optical fiber"), showing the optical transmitting characteristics of this type of older optical fiber.
Figure 2:
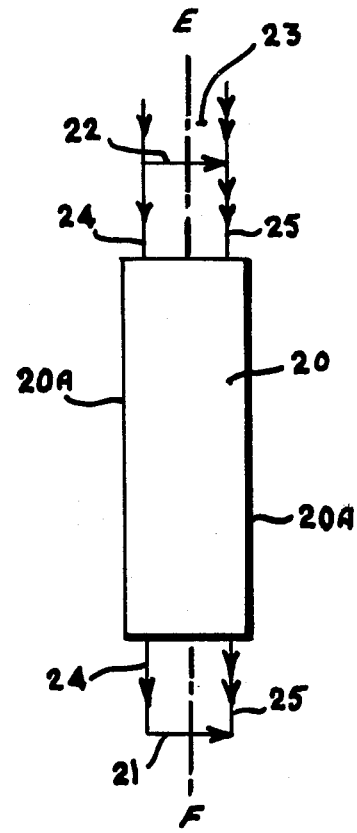
FIG. 2 is a pictorial and schematic depiction, in simplified form, of a representative later prior art single strand of optical fiber (hereinafter referred to as a "focused optical fiber"), showing the optical transmitting characteristics of this type of newer optical fiber.

As a matter that is necessarily preliminary to the description of the preferred embodiment of the invention, reference is made to FIGS. 1 and 2, in which is shown, respectively, a single strand of representative conventional optical fiber 10 and a single strand of a representative focused optical fiber 20.

It is to be noted, as shown in FIG. 1, that the single strand of a representative conventional optical fiber 10 transmits only a dot (such as 11), if an object (such as 12) is lighted with a light beam (such as 13) having edge rays (such as 14 and 15), not an image of the object 12. In this regard, it is to be noted that a "bundle" (i.e., a plurality) of these conventional optical fibers (i.e., fibers such as 10), with one such optical fiber provided for each small portion of an image, will transmit the completed image. However, even if a bundle of conventional optical fibers were to be twisted (as such a bundle can be); the image that is transmitted through the bundle would not be twisted (i.e., will not be rotationally displaced).

It is also to be noted that, as shown in FIG. 2, the single strand of a representative focused optical fiber 20, unlike a single strand of conventional optical fiber (such as 10, FIG. 1), will transmit a complete and real image 21 of the object 22 which is lighted with a light beam (such as 23) having edge rays (such as 24 and 25). Such a single strand of focused optical fiber 20, FIG. 2, is made by, and is commercially available from, the Nippon Sheet Glass Co., Ltd., 136 Central Avenue, Clark, New Jersey 07066. This type 20, FIG. 2, of new optical fiber, which unlike its predecessor 10, FIG. 1, is self-focusing, is known in the art as self-focusing optical fiber or gradient optical fiber.

Most importantly, it is to be noted and remembered that, while a single strand of conventional optical fiber 10 functionally only transmit a dot 11 and a single strand of the focused optical fiber 20 transmits a complete real image 21, there are sufficient structural differences between the two types of optical fibers. In essence, the conventional fiber optic single strand 10 is structured such that it is uniformly refractive across the core, whereas the focused optical fiber single strand 20 is structured such that its index of refraction forms a uniform gradient across the core, thereby focusing the path of light as the light passes through the fiber 20. Stated another way and more specifically, the focused optical fiber 20 has a parabolic refractive index which is largest at the axis E-F and continuously decreases toward the periphery 20A, thereby functioning as a series of conventional "hard optics" converging-/diverging lenses, with the full real image 21 being projected and transmitted in discrete steps throughout the length of the fiber.

DESCRIPTION OF THE PREFERRED EMBODIMENT

Figure 3:
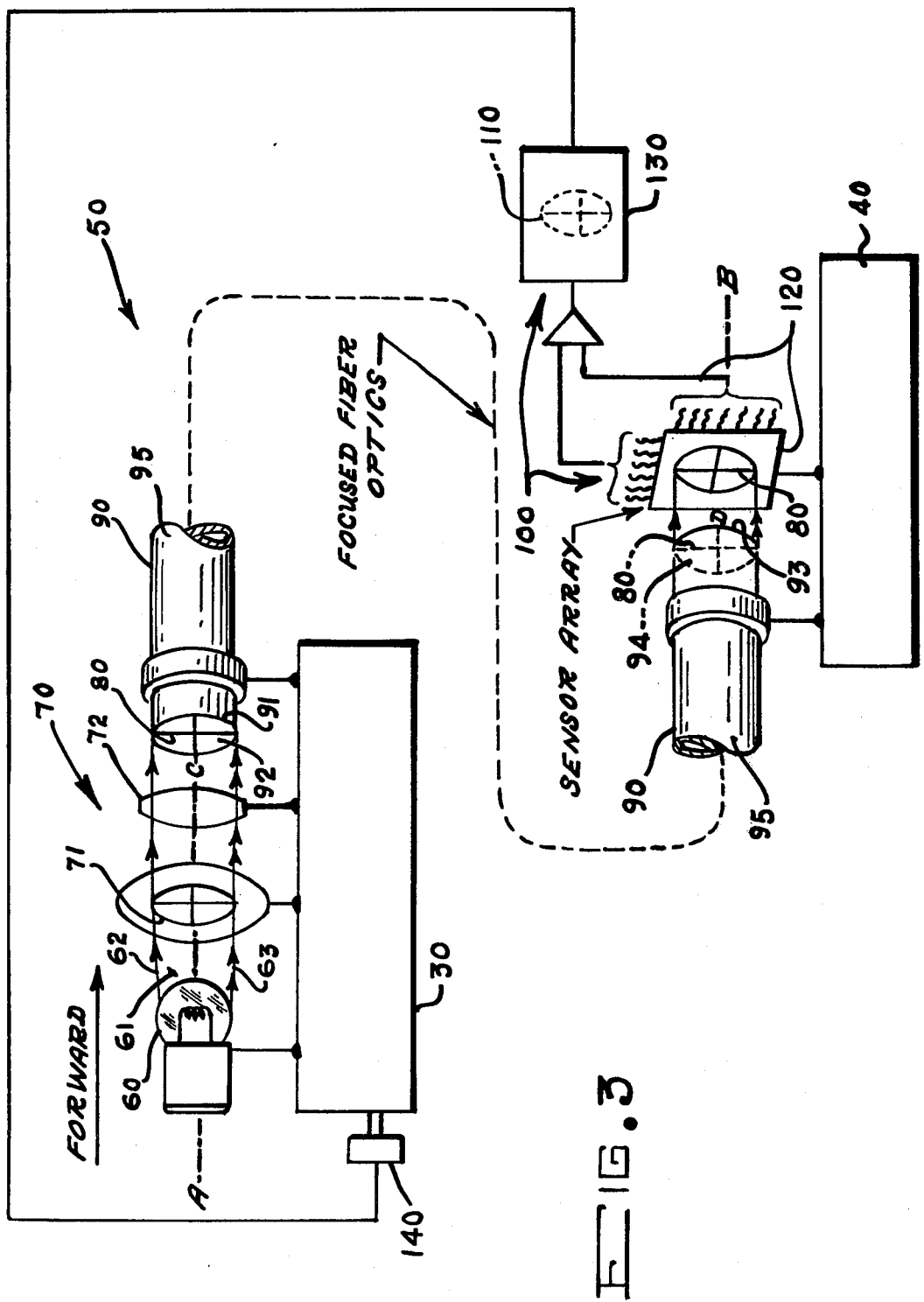
FIG. 3 is a side elevation view, in simplified schematic and pictorial form, of a preferred embodiment of the invention, which includes the structural use therein of a single strand (i.e., a single one) of the newer focused optical fiber.

With reference to FIG. 3, therein is shown the preferred embodiment 50 of the invention.

As a preliminary matter, it is to be remembered that the inventive focused single strand optical fiber rotational alignment sensing and comparing system 50 has an optical axis A-B and is for use in determining if a first member, such as 30, FIG. 3, and a second member, such as 40, FIG. 3, are rotationally (or rotatably) aligned, i.e., whether they are "twisted" in positional relationship to each other, as will be explained more fully later herein.

Still with reference to FIG. 3, and in the most basic and generic structural form, the invention 50 comprises: (a) a light source 60 attached to the first member 30 and emitting a light beam 61 having edge rays 62 and 63; (b) a means, generally designated 70, for intercepting the emitted light beam 61, and for forming an image (such as 80) with the intercepted light beam 61, and also for transmitting the formed image 80, with this means 70 attached to the first member 30 and disposed forward of and in optical alignment with the emitted light beam 61; (c) a single strand of focused optical fiber (such as 90) that has an optical axis C-D (which is coincident with the optical axis A-B of the inventive optical system 50, as a whole), a first end 91 with a flat face 92 thereat that is perpendicular to optical axis A-B, a second end 93 with another flat face 94 that is perpendicular to optical axis A-B, a perpendicular surface 95, and a parabolic refractive index which is largest at the axis C-D and continuously decreases toward the peripheral surface 95, with this single strand of focused optical fiber 90 attached at its first end 91 to the first member 30 and also attached at its second end 93 to the second member 40, and with this optical fiber 90 disposed forward of and in optical alignment with the light beam intercepting and image-forming and transmitting means 70, and also with this optical fiber 90 concurrently disposed such that the flat face 92 at the first end 91 of the optical fiber 90 is in optical alignment with the light beam-intercepting and image-forming and transmitting means 70; and, (dd) a means (generally designated 100) for sensing the formed image 80 that is emitted from and is transmitted at the flat face 94 at the second end 93 of the optical fiber 90, and for comparing this emitted and transmitted formed image 80 to a stored identical image (such as 110) whose rotational position (relative to the optical axis A-B) has been preselected to indicate the correct alignment of the first and second members 30 and 40.

More specifically, and still with reference to FIG. 3, the means 70 for intercepting the emitted light beam 60, and for forming an image 80 with the intercepted beam 61, and also for transmitting the formed image 80, includes as a matter of preference and not of limitation: (a) a light-transmissive cross-hair reticle component (such as 71) which is disposed forward of and in optical alignment with the emitted light beam 61, and which is also attached to the first member 30, and (b) a lens means (preferably a relay lens) 72 which is disposed forward of and in optical alignment with the light-transmissive cross-hair reticle component 71, and which is also attached to the first member 30.

Additionally, as may be surmised, the focused, single strand, of optical fiber 90 is preferably composed of (i.e., made of) the hereinbefore described and shown self-focusing optical fiber lens material such as 20, FIG. 2.

Further, also as a matter of preference and not of limitation, the means 100 for sensing the formed image 80 and for comparing the sensed formed image 80 to the stored image 110 whose rotational position (relative to the optical axis A-B of the inventive system 50) has been preselected to indicate the correct alignment of the first member 30 relative to the second member 40, preferably includes: (a) a means (generally designated 120) for sensing (i.e., detecting), and for electrically transmitting, the formed image 80 that is transmitted by the flat face 94 at the second end 93 of the focused optical fiber 90, with this means 120 disposed forward of and in optical alignment with the flat face 94, and with this means 120 also concurrently disposed such that the formed image 80 impinges upon this image-sensing and electrically transmitting means 120; and, a means (generally designated 130) for comparing the formed image 80 (that is sensed (i.e., detected) and is electrically transmitted by the means 120) to the stored, preselected correctly rotationally-positioned image 110, with this comparing means 130 being in electrical connection with means 120. Means 120 is conventional and well known in the art, as is means 130.

MANNER OF OPERATION AND OF USE OF THE PREFERRED EMBODIMENT

The manner of operation and of use of the preferred embodiment 50, FIG. 3, of the invention can be easily ascertained by any person of ordinary skill in the art from the foregoing description, coupled with reference to the contents of the drawing, particularly FIG. 3, in which the members 30 and 40 are shown rotationally aligned, rather than rotationally mis-aligned (i.e., twisted), to maintain the simplicity of the drawing, which is consistent with the structural simplicity of this unique inventive system.

For others, the following explanation is given. When the members 30 and 40 are rotationally aligned, the formed image 80 of the cross-hair reticle 71, which is transmitted from the first end 91 of the optical fiber 90 to the second end 92 of the optical fiber 90 and then impinges upon the image-sensing means 120, is "upright" (i.e., as shown in FIG. 3). This image is stored (and, as shown in FIG. 3, this stored image is generally designated 110) in an image comparison means 130, such as a computer memory. However, on the other hand, if for example member 30 rotates (i.e., twists) in any direction, so does the cross-hair reticle 71, and the formed image 80 is also rotated. When the rotated image is transmitted from second end 92 of optical fiber 90, it impinges upon image-sensing means 120 in its rotated position, and is compared with the original image by means 130. Since the newly-formed image does not "match" the stored image 110 (because the newly-formed image is rotated or "twisted" around the optical axis A-B), therefore the first member 30 is mis-aligned with relation to the second member 40; and, it is mis-aligned to the extent, and in the direction, of the newly-formed twisted image. As shown in FIG. 3, the mis-aligned member 30 may be automatically, and correctly, re-aligned by and with the motor 140 which is responsive to a re-alignment signal.

CONCLUSION

It is abundantly clear from all of the foregoing, and from the contents of the Figures of the drawings (particularly FIG. 3), that the stated desired objects, as well as other related objects, of the invention have been achieved.

It is to be noted that, although there have been described and shown the fundamental and unique features of the invention as applied to a preferred embodiment, various other embodiments, variations adaptations, additions, omissions, and the like may occur to, and can be made by, those of ordinary skill in the art, without departing from the spirit of the invention. For example: (a) the light-transmissive component 71 need not be a cross-hair, but rather can be any appropriate image-forming target, such as an opaque mask having any desired pattern cut into it, or simply an opaque target around the periphery of which light passes; (b) the inventive system may be adapted to include a drive motor (such as 140, FIG. 3), or other well known conventional means, for automatically realigning the mis-aligned member (such as a "servo" mechanism), after the member's mis-alignment has been determined by the use of the basic system 50, FIG. 3, with this drive motor 140 or other means being in appropriate electrical and/or mechanical connection with the image-sensing and comparing means 100 of the system 50 and in connection with the mis-aligned member; and, (c) the inventive system 50 can be expanded to correct for additional degrees of mis-alignment by utilizing multiple sensing units or by transmitting 3-dimensional images.

What is claimed is:

1. A focused, single strand, optical fiber rotational alignment image-sensing and comparing system for determining if a first member and a second member are rotationally aligned, wherein this system has an optical axis, comprising:
   a. a light source attached to said first member and emitting a light beam;
   b. means for intercepting said emitted light beam, forming an image with said intercepted beam, and transmitting said formed image, wherein this means is attached to said first member and is disposed forward of and in optical alignment with said emitted light beam;
   c. a single strand of focused optical fiber having an optical axis coincident with said optical axis of this rotational alignment image-sensing and comparing system, a first end with a flat face thereat that is perpendicular to said axis, a second end with another flat face that is perpendicular to said axis, a peripheral surface, and a parabolic refractive index which is largest at said axis and continuously decreases toward said peripheral surface, wherein this single strand of focused optical fiber is attached at said first end to said first member and is attached at said second end to said second member, and wherein said single strand of focused optical fiber is disposed forward of and in optical alignment with said light beam-intercepting and image-forming and transmitting means, and also wherein said signal strand of focused optical fiber is concurrently disposed such that said flat face at said first end thereof is in optical alignment with said light beam-intercepting and image-forming and transmitting means, thereby said image transmitted by this means impinges upon said first end flat face, is transmitted through this single strand of focused optical fiber to said second end flat face thereof, and is emitted from and is transmitted at said second end flat face;
   d. and, means for sensing said formed image that is emitted from and is transmitted at said second end flat face of said single strand of focused optical fiber, and for comparing this emitted and transmitted formed image to a stored identical image whose rotational position, relative to said optical axis of this rotational alignment image-sensing and comparing system, has been preselected to indicate correct alignment of said first and second members;
   whereby a rotational displacement of said formed image as compared to said stored image can be ascertained, and thereby a rotational mis-alignment of said first member as compared to said second member can be determined.

2. A focused, single strand, optical fiber alignment image-sensing and comparing system, as set forth in claim 1, wherein said means for intercepting said emitted light beam, forming an image with said intercepted beam, and transmitting said formed image, includes:
   a. a light-transmissive cross-hair reticle component disposed forward of and in optical alignment with said emitted light beam and attached to said first member;
   b. and, a relay lens disposed forward of and in optical alignment with said light-transmissive cross-hair reticle component and attached to said first member.

3. A focused, single strand, optical fiber rotational alignment image-sensing and comparing system, as set forth in claim 2, wherein said single strand of focused optical fiber is composed of a self-focusing optical fiber.

4. A focused, single strand, optical fiber rotational alignment image-sensing and comparing system, as set forth in claim 3, wherein said means for sensing said formed image and for comparing said formed image to said stored image, includes:
   a. means for sensing, and for electrically transmitting, said formed image that is transmitted by said second end flat face of said single strand of focused optical fiber, wherein this image-sensing and electrically transmitting means is attached to said second member, is disposed forward of and in optical alignment with said second end flat face of said single strand of focused optical fiber, and is also disposed concurrently such that said formed image impinges upon this image-sensing and electrically transmitting means;
   b. and, means for comparing said formed image, that is sensed and electrically transmitted by said image-sensing and electrically transmitting means, to said stored, preselected, rotationally-positioned image, with this image-comparing means being in electrical connection with said image-sensing and electrically transmitting means.

* * * * *